United States Patent
Coffey et al.

[15] 3,707,652
[45] Dec. 26, 1972

[54] BUS BAR INTERCONNECTION ARRANGEMENT FOR STACKABLE ELECTRICAL PANELS

[72] Inventors: William F. Coffey, Stratford; Kenneth R. Coley, Fairfield, both of Conn.

[73] Assignee: Westinghouse Electric Corporation, Pittsburgh, Pa.

[22] Filed: Feb. 28, 1972

[21] Appl. No.: 229,990

[52] U.S. Cl.................................317/120, 317/106
[51] Int. Cl..................................................H02b 1/20
[58] Field of Search....................317/104–108, 111, 317/112, 120, 118

[56] References Cited

UNITED STATES PATENTS

| | | |
|---|---|---|
| 3,322,878 | 5/1967 | Christensen..........................317/106 |
| 3,463,968 | 8/1969 | Olashaw..............................317/120 |

*Primary Examiner*—Robert K. Schaefer
*Assistant Examiner*—Gerald P. Tolin
*Attorney*—A. T. Stratton

[57] ABSTRACT

A bus bar interconnection arrangement for stackable electrical panels includes bus bars mounted along the rear wall of a panel enclosure with the bar ends bent forward along the side walls of the enclosure. Openings in the side walls expose the bar ends to permit mating engagement and direct contact connection with complementary bar ends of a bus bar of an adjacent panel.

4 Claims, 4 Drawing Figures

PATENTED DEC 26 1972 3,707,652

BUS BAR INTERCONNECTION ARRANGEMENT FOR STACKABLE ELECTRICAL PANELS

CROSS-REFERENCE TO RELATED APPLICATION

This is related to our patent application Ser. No. 229,994, filed 2/28/72 for a Front Cover Assembly For Electrical Panels.

BACKGROUND OF THE INVENTION

This invention relates to a bus bar interconnection arrangement for stackable electrical panels and more particularly to an improved bus bar arrangement for registering and assembling bar bus bar ends of stacked electrical panels.

In centrally located electrical power distribution centers, several electrical panels and enclosures with such units as main disconnect switches, multimeter centers, circuit breaker units and bus are ducting systems are mounted together in a stacked relationship. These stacked units usually include a main bus bar arrangement connecting the main electrical service entrance with a plurality of branch circuits. Interconnection of the main bus bars between units is often a time consuming and therefore expensive field operation. Many of the prior bus bar interconnection arrangements include separate bar connecting links that increased the expense of such arrangements including the cost of manufacturing and storage of additional accessory items for each electrical panel. It is desirable therefore to have a bus bar interconnection arrangement which is adaptable for various stacked electrical panel systems, which is manufactured by simple techniques, and which does not require additional devices for interconnecting the bus bar ends. It is further desirable to have a bus bar interconnection arrangement which is quickly and easily assembled in the field particularly in panel enclosures of the type which may have limited access to the bus bar ends.

SUMMARY OF THE INVENTION

In accordance with the present invention, an improved bus bar interconnection arrangement for stackable electrical panels includes a bus bar mounted on the rear wall of an enclosure of the panel which has opposing side walls intended for stacked mounting with adjacent panel enclosures. The opposite ends of the bus bar are bent forward so as to be positioned with the openings formed in the opposing side walls. When the electrical panel is stacked with an adjacent electrical panel having a similar bus bar interconnection arrangement and the openings of the side walls are in registration, bus bar ends of the adjacent panels will mate in a mutually engaging and overlapping relationship. Complementary holes in the bar ends receive a screw fastener applied from within one of the enclosures so as to be securely attached together in a mechanically strong and good electrically conductive relationship. Another feature of this invention includes fastening the bus bar ends by applying the screw fastener from within one of the enclosures of adjacent panels without the use of additional bar connecting links. A further feature of this invention includes an interconnecting arrangement for bus bars of stacked electrical panels having separate compartments in which one bus bar end is normally inaccessible from the front of the enclosure and is to be connected with a bus bar end which is accessible only at the adjacent electrical panel. Other advantages and features of the present invention will be apparent from the description including the drawings described hereinafter.

DESCRIPTION OF THE PREFERRED EMBODIMENT

Figure 1:
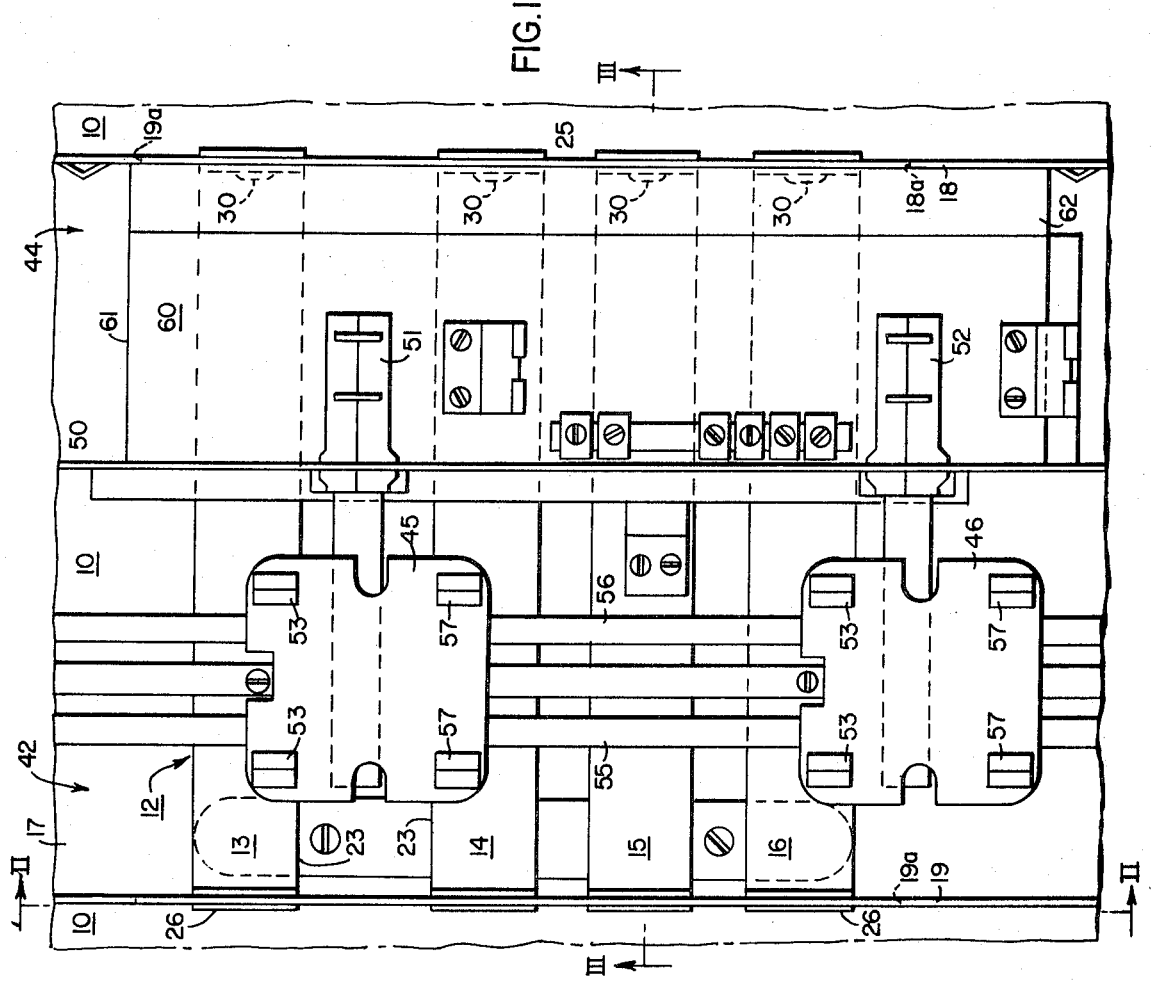
FIG. 1 is a partial front view of horizontally stacked electrical panels illustrating in detail a center panel including the bus bar interconnection arrangement made in accordance with this invention.

Referring now to the drawing and more particularly to FIG. 1, wherein there is shown a partial view of horizontal stacked electrical panels 10 of a type used for supporting various components of an electrical distribution system mounted at a central location such as found in an apartment building. In a preferred embodiment described herein, the electrical panels 10 include multimeter centers which meter and distribute branch circuits from a main bus assembly 12 including bus bars 13, 14, 15 and 16 that are also connected to a main electrical service entrance. The electrical panel 10 is described in more detail in our above identified patent application Ser. No. 229,994. The center panel of the electrical panels 10 is shown in detail and it is to be understood that the adjacent panels, indicated by phantom lines are identical panels. However, any stacked electrical panels having a main bus assembly may include the present invention.

Figure 2:
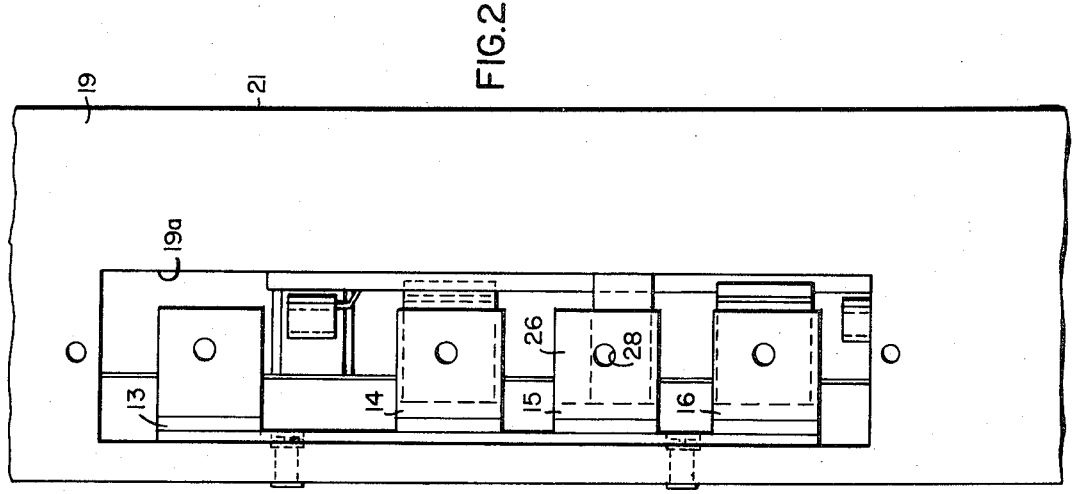
FIG. 2 is a side sectional view of the electrical panel shown in FIG. 1 taken along the axis II—II and looking in the direction of the arrows.
Figure 3:
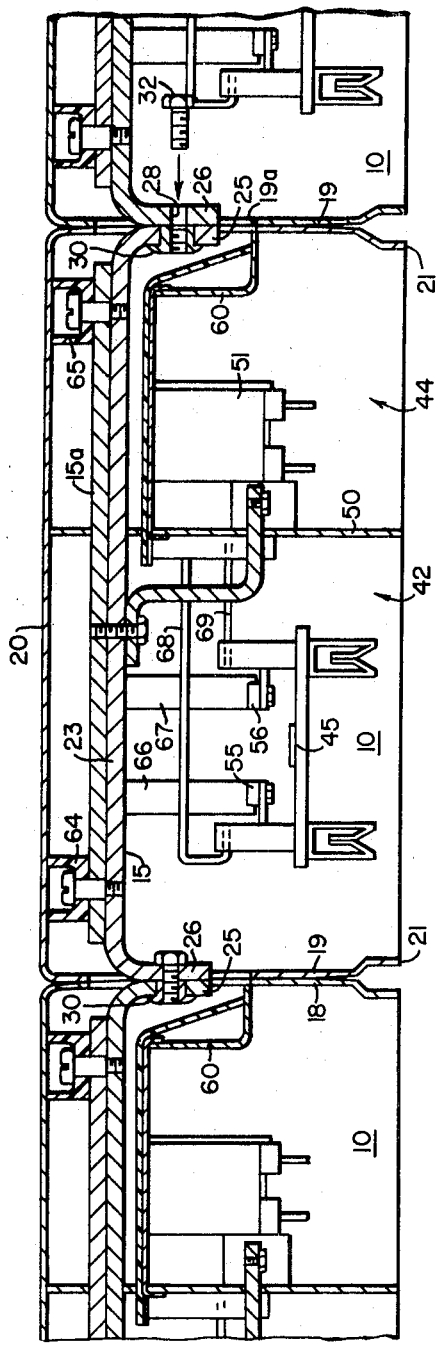
FIG. 3 is a bottom sectional view illustrating in detail the electrical panels shown in FIG. 1 taken along axis III—III and looking in the direction of the arrows.

The main bus bars of the assembly 12 are mounted, in a manner described in detail hereinbelow, in a rearward portion of an enclosure 17 having a box-like or rectangular cross-section as shown in FIG. 3. A pair of opposing side walls 18 and 19 extend forwardly from a rear wall 20 and terminate at the front edge 21 of the enclosure 17. The pair of opposing side walls 18 and 19 are formed with aligned openings 18A and 19A. The openings are rectangular as illustrated in FIG. 2 and are mutually aligned with the bus bars 13, 14, 15 and 16.

The bus bars 13, 14, 15 and 16 each include an elongated body part 23, as shown in FIGS. 1 and 3, extending between the opposing side walls 18 and 19. Bar ends 25 and 26 of each bus bar are bent forward from the body part 23 at an angle of substantially 90°. Each of the bar ends 25 and 26 is disposed within or immediately adjacent the openings 18A and 19A, respectively, of the associated side walls in order to be circumscribed by the edges of the openings. The bar ends 25 and 26 are each substantially coplanar with the outer surface of a side wall so as to be at least flush therewith and preferably extend slightly outside. Circular holes 27 and 28 are drilled into the bar ends 25 and 26, respectively, so as to extend perpendicular thereto.

For simple manufacture, the holes 27 and 28 have the same diameter and are coaxially located to each other to be mutually aligned by being identically located in each bar end.

The hole 27 receives a tubular internally threaded insert 30 having radial head 30A at one end. The insert 30 is press fitted into the hole 27 so as to remain in place in the bar end 25 with the head 30A located at the inner side thereof. Accordingly, each of the bar ends at the righthand side of FIG. 1 include an insert 30 which is coaxially aligned with a hole in the bar ends at the righthand side.

Figure 4:
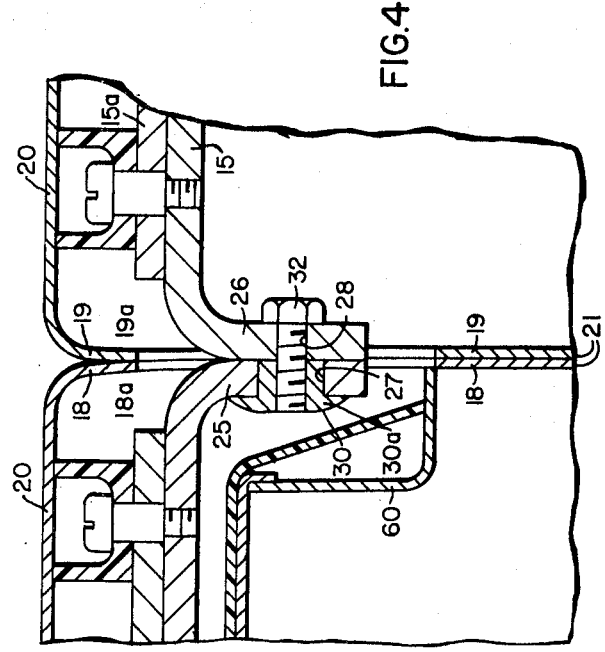
FIG. 4 is an enlarged fragmentary view of FIG. 3 illustrating bus bar ends connected together in accordance with this invention.

FIGS. 3 and 4 illustrate the bar end 25 connected to a bar end 25 of two adjacent electrical panels 10. A screw fastener 32 is applied through the hole 28, it having clearance to receive the threads of the screw 32, and is threaded to the insert 30. This clamps the bar ends 25 and 26 of the adjacent panels 10 in a strong mechanically engaging and electrically conductive relationship. The screw 32 is preferably a machine screw but it is possible to use a self-tapping screw fastener if an insert 30 is not used to clamp the connecting bar ends together.

FIG. 1 illustrates a partial view of an enclosure 17 of a multimeter center electrical panel 10, as noted hereinabove, which has a meter compartment 42 and a combined wiring gutter and breaker compartment 44, each extending vertically. The meter compartment 42 is intended to receive a plurality of vertically ganged watthour meters, not shown, on the meter socket bases indicated by numerals 45 and 46. As an example, two to six of the meter socket bases have been included in the panel 10. A vertical partition 50 separates the meter compartment 42 from the breaker compartment 44. Circuit breaker receptacles 51 and 52 are mounted so that plug-in circuit breakers connected thereto are connected with a one pair of jaw terminals 53 of a horizontally adjacent meter socket base. The compartment 44 further receives the wiring conductors, not shown, connecting a branch circuit associated with a circuit breaker. The main bus assembly 12 extends horizontally across the meter compartment 42 and breaker compartment 44, as noted hereinabove, and is connected to a pair of single phase bus bars 55 and 56 also connected across a second pair of meter jaw terminals 57 on each meter socket base. Externally, each main bus bar is connected with a polyphase service and the bus bars of a main bus assembly of an adjacent electrical panel.

Referring in more particular detail to the enclosure 17, which is made of a sheet metal material, a main bus barrier 60 extends horizontally within the breaker compartment 44 between the front of the enclosure 17 and the bus bars 13, 14, 15 and 16. Rearward extending sides 61 and 62 of the barrier 60 extend to the rear wall 20 to enclose the main bus assembly 12 between the side wall 19 and the partition 50. One purpose of the barrier 60 is to prevent any interference between the wire conductors placed in the breaker compartment and the bus bars 13, 14, 15 and 16. The barrier 60 is normally integrally attached to the enclosure 17 such that the bar ends 25 are not accessible from within the electrical panel 17. As noted hereinabove, the bar ends 25 and 26 are accessible from the outside of the enclosure since they are exposed through the side wall openings 18A and 19A.

A front cover assembly, not shown, and described in application Serial No. 229,994 fits over the front edges 21 of the enclosure 17 to enclose the front openings of the meter and breaker compartments 42 and 44. This cover has detachable section covering the breaker section 44 to permit access thereto after watthour meters have been installed and the meter covers attached to another section of the front cover in a sealed relationship. Accordingly, the barrier 60 prevents undesired contact with the main bus assembly 12 when the breaker compartment is opened.

As shown in the cross sectional view of FIG. 3, taken through the main bus bar 15, each of the bus bars 13, 14, 15 and 16 include a two piece bus bar construction including a supplemental bar strap indicated by numeral 15A, made of a copper or aluminum bar stock material as are the other bus bars. The bus bar 15 and strap 15A are mounted on a pair of molded insulating pads 64 and 65 secured to the rear wall 20. The other main bus bars 13, 14 and 16 are similarly mounted to the rear wall 20. Conductive blocks 66 and 67 make connections between a pair of the bus bars of the assembly 12 and connector lugs of the pair of meter jaw terminals 53. Conductive straps 68 and 69 make connections between the pair of meter jaw terminals 57 and the circuit breaker receptacles 51 and 52.

When the enclosures 17 are horizontally stacked, as shown in FIGS. 1 and 3, so that the side walls 18 and 19 are disposed in substantially vertical planes and are horizontally adjacent in a stacked relationship, the side walls 18 and 19 of adjacent panels will be in facing relationship and an opening 18A will be aligned with an opening 19A. Accordingly, the ends of the four main bus bars of the adjacent panels will be in registration. Positive contact between adjacent bar ends 25 and 26 is provided since they extend slightly beyond the side walls 18 and 19. In normal practice, the side walls 18 and 19 of adjacent panels will be bolted together and, since they are sufficiently flexible, will be bowed outwardly around the bar ends after they are interconnected. At this point in the installation, the bar ends 25 and 26 of the main bus bars of the adjacent panels will be in registering engagement and the associated holes 27 and 28 will be coaxially aligned.

Since the breaker compartment 44 does not afford access to the main bus assembly 12, access to the bar end 25 is only permitted through an adjacent enclosure having a compartment such as the meter compartment 42 where the bar end 26 is accessible. The adjacent surfaces of the bus bar end 25 and 26 engaged along a vertical plane so as to have large electrical contacting areas mutually engaging. The machine screw 32 as passed through the clearance hole 28 of the bar end 26 from within the meter compartment 42. Since the hole 28 is aligned with the mating hole 27 having the threaded insert 30 of an adjacent electrical panel bus bar, the screw 32 is threaded to the insert 30 so as to clamp the bus bar ends 25 and 26 securely together forming a solid electrical connection therebetween. This technique of interconnecting the bus bar ends is repeated for each of the bus bars in the main bus assembly 12 of each electrical panel 10 so as to complete the mounting and electrical interconnection of the main bus bars of adjacent stacked electrical panels 10 so as to be fed by a single main bus system.

It is seen that the present invention affords an improved manner of interconnecting the bus bars ends of stacked electrical panels and is made in a manner which reduces the cost of manufacturing and installation and reduces the number of bus bar parts by eliminating any need for separate interconnecting bar links to be installed between adjacent bus bars of stacked electrical panels.

We claim as our invention:

1. A bus bar interconnection arrangement for stackable electrical panels comprising:

a box enclosure including a rear wall and opposing side walls extending forward from said rear wall, each of said side walls of said enclosure having openings exposing the interior of said enclosure;

a bus bar having a main body part supported on said rear wall and extending between said side walls;

said bus bar further including end parts bent forward from said main body part disposed in a substantially coplanar relationship with said opposing side walls within said openings, whereby when said enclosure is mounted in stacked relationship with another enclosure having said bus bar interconnection arrangement an end of said bus bar registers in direct mutually engaging relationship with an end of a bus bar of an adjacent enclosure; and fastener means engaging the bus bar ends such that said bus bar ends are clamped together in electrically conducting relationship with other bus bars when said box enclosure is mounted in stacked relationship with other enclosures.

2. A bus bar interconnection arrangement as set forth in claim 1 wherein said bus bar includes a first end having a hole opening and a second end having a hole opening including an internally threaded portion coaxially aligned with said hole opening of said first end, and said fastener means includes a screw having a clearance fit through said hold opening of said first bus bar end.

3. A bus bar interconnection arrangement as set forth in claim 2 wherein said enclosure includes a barrier for separating said second end of said bus bar from access from within said enclosure and said first end of said bus bar is freely accessible from within said enclosure.

4. A bus bar interconnection arrangement for a stackable electrical panel as set forth in claim 3 wherein said enclosure houses a multimeter center and includes first and second separated compartments, and said barrier is located in one of said first and second compartments to separate said bus bar from the one compartment.

* * * * *